United States Patent
Nerst et al.

(10) Patent No.: US 8,825,907 B2
(45) Date of Patent: Sep. 2, 2014

(54) INCORPORATING A MOBILE DEVICE INTO A PEER-TO-PEER NETWORK

(75) Inventors: Alex Nerst, Ashdod (IL); Boaz Zilberman, Ramat Hasharon (IL)

(73) Assignee: Gendband US LLC, Frisco, TX (US)

( * ) Notice: Subject to any disclaimer, the term of this patent is extended or adjusted under 35 U.S.C. 154(b) by 861 days.

(21) Appl. No.: 12/066,405

(22) PCT Filed: May 9, 2006

(86) PCT No.: PCT/IL2006/000549
§ 371 (c)(1),
(2), (4) Date: Mar. 11, 2008

(87) PCT Pub. No.: WO2007/031981
PCT Pub. Date: Mar. 22, 2007

(65) Prior Publication Data
US 2008/0256263 A1    Oct. 16, 2008

Related U.S. Application Data

(60) Provisional application No. 60/596,318, filed on Sep. 15, 2005.

(51) Int. Cl.
| | |
|---|---|
| *G06F 15/16* | (2006.01) |
| *H04M 7/00* | (2006.01) |
| *H04W 92/18* | (2009.01) |
| *H04L 29/08* | (2006.01) |
| *H04W 88/02* | (2009.01) |

(52) U.S. Cl.
CPC ............. *H04L 67/104* (2013.01); *H04W 92/18* (2013.01); *H04W 88/02* (2013.01); *H04L 29/08846* (2013.01); *H04L 67/2861* (2013.01)
USPC ........................ 709/250; 709/201; 379/220.01

(58) Field of Classification Search
USPC ......................................................... 709/250
See application file for complete search history.

(56) References Cited

U.S. PATENT DOCUMENTS

| | | | |
|---|---|---|---|
| 7,444,372 B2 * | 10/2008 | Gupta et al. ................... | 709/203 |
| 7,487,509 B2 * | 2/2009 | Hugly et al. ................... | 719/310 |
| 2002/0188657 A1 * | 12/2002 | Traversat et al. ............. | 709/201 |
| 2003/0061287 A1 * | 3/2003 | Yu et al. ......................... | 709/205 |
| 2004/0031038 A1 * | 2/2004 | Hugly et al. ................... | 719/315 |
| 2004/0066770 A1 | 4/2004 | Pabla et al. | |
| 2004/0125776 A1 * | 7/2004 | Haugli et al. ................. | 370/338 |
| 2004/0148434 A1 | 7/2004 | Matsubara et al. | |
| 2004/0162871 A1 * | 8/2004 | Pabla et al. .................... | 709/201 |
| 2004/0240656 A1 * | 12/2004 | Poustchi ................. | 379/220.01 |

(Continued)

OTHER PUBLICATIONS

Taiwan Patent Office, Taiwan Examination Report mailed Jul. 19, 2013 for Application No. 2704/delnp/2008, 4 pages.

*Primary Examiner* — Brian P Whipple
*Assistant Examiner* — James Edwards
(74) *Attorney, Agent, or Firm* — Haynes amd Boone, LLP

(57) ABSTRACT

A system and a method enabling a mobile user-terminal to participate as a peer in a peer-to-peer network, the system including a mobile user-terminal and a network device, the network device including a peer-communication module operative to communicate as a peer in a peer-to-peer network, a terminal-communication module operative to communicate with a user-terminal device, and a proxy module operative to perform peer operations in the peer-to-peer network on behalf of the user-terminal device.

48 Claims, 14 Drawing Sheets

(56) References Cited

U.S. PATENT DOCUMENTS

| | | | |
|---|---|---|---|
| 2005/0086300 A1* | 4/2005 | Yeager et al. | 709/204 |
| 2006/0013219 A1* | 1/2006 | Neilson et al. | 370/389 |
| 2006/0072569 A1* | 4/2006 | Eppinger et al. | 370/389 |
| 2006/0126594 A1* | 6/2006 | Tu | 370/352 |
| 2006/0193265 A1 | 8/2006 | Simionescu et al. | |
| 2006/0209819 A1 | 9/2006 | Jennings, III et al. | |
| 2008/0200168 A1* | 8/2008 | Jiang | 455/432.1 |
| 2009/0129371 A1* | 5/2009 | Bishay | 370/352 |
| 2012/0311060 A1* | 12/2012 | Beck et al. | 709/206 |

* cited by examiner

INCORPORATING A MOBILE DEVICE INTO A PEER-TO-PEER NETWORK

CROSS-REFERENCE TO RELATED APPLICATIONS

This application is a U.S. National Phase Application under 35 U.S.C. 371 of PCT International Application No. PCT/IL2006/000549, which has an international filing date of May 9, 2006, and which claims priority from U.S. Provisional Patent Application No. 60/596,318, filed Sep. 15, 2005, both of which are incorporated herein by reference in their entirety.

FIELD AND BACKGROUND OF THE INVENTION

The present invention relates to peer-to-peer networks and, more particularly, but not exclusively, to a battery operated device communicating over a peer-to-peer network.

A communication network includes a transmission and switching fabric that connects a plurality of terminal devices. In a conventional network the intelligence of the network resides within the switching system, which keeps track of all the terminal devices and their addressing. In a peer-to-peer network the network intelligence is distributed among the terminal devices. Each terminal device must publicize its presence and addressing information to its peers of choice and keep track of the presence and addressing of the peers with which it may communicate.

Similarly, three types of application topologies can be defined: mainframe, client-server and peer-to-peer. In a mainframe topology the application is executed by the mainframe and the terminal devices are passive. In a client-server topology a part of the application is executed by the server, and another part is executed by the terminal devices. In a peer-to-peer topology almost all of the application is processed by the terminal devices and a server is commonly available for limited coordination functions.

There is a place for all types of networks and application topologies and each has its advantages and disadvantages. Generally, centralized networks are more robust but distributed networks are faster to establish and to develop. The main advantage of peer-to-peer networks and applications is that they can be established by users, at relatively low cost. While most of the networks are still conventional, peer-to-peer networks are becoming increasingly prevalent. Furthermore, a growing number of services are available only via peer-to-peer networks.

In an increasingly mobile society, cellular handset and other mobile communication devices offer a user the ability to be in contact with others or reachable at all times. Wireless networks, such as cellular networks, are usually conventional networks. However, mobile wireless devices should be capable of communicating over peer-to-peer networks as well.

One problem with mobile wireless devices communicating over peer-to-peer networks is the requirement that the peer device continuously present itself and interrogate the presence of its peers. For a battery-powered device this is a problem, because these operations quickly drain the battery. This frequent communication loads the wireless network and may be costly.

Furthermore, wireless devices tend to lose their radio connection with the network due to electromagnetic screening. This phenomenon is common in basements, tunnels, buildings with metal frames, etc. This not only prevents real-time communication but also adversely affects non-real-time communication, such as messaging, including immediate messaging services, short messaging services, etc., when provided over a peer-to-peer network.

When connecting two or more conventional networks, it is the responsibility of the networks to bridge differences of standards, formats and capabilities between the networks, and to make these differences transparent to the terminal devices. This functionality is usually provided by a bridge or a gateway device that is positioned between the networks to provide conversion services. This is obviously impossible when peer-to-peer networks are involved. A terminal device operating in two or more peer-to-peer networks must be equipped to support the specifications of each of the networks. However, when a peer-to-peer network spans two or more 'physical' networks, such as a fixed network and a wireless network, the requirements of the peer-to-peer network may be incompatible with one of the physical networks, typically being the cellular network.

There is thus a widely recognized need for, and it would be highly advantageous to have, a peer-to-peer network, and peer-to-peer devices, devoid of the above limitations.

SUMMARY OF THE INVENTION

According to one aspect of the present invention there is provided a network device containing a peer-communication module operative to communicate as a peer in a peer-to-peer network, a terminal-communication module operative to communicate with a user-terminal device, and a proxy module operative to perform peer operations in the peer-to-peer network on behalf of the user-terminal device.

According to another aspect of the present invention there is provided a network device additionally operative to initiate the peer operations.

According to yet another aspect of the present invention there is provided a network device additionally operative to register as a peer in the peer-to-peer network on behalf of the user-terminal device.

According to still another aspect of the present invention there is provided a network device additionally operative to provide call progress functionality on behalf of the user-terminal device.

According to yet another aspect of the present invention there is provided a network device additionally operative to provide the call progress functionality for at least one of incoming calls and outgoing calls.

Also according to another aspect of the present invention there is provided a network device additionally operative to provide ring-back signal to a calling party calling the user-terminal device on behalf of the user-terminal device.

Additionally according to another aspect of the present invention there is provided a network device additionally operative to selectively forward to the user-terminal device information received on behalf of the user-terminal device.

Further according to another aspect of the present invention there is provided a network device additionally operative to selectively forward information on behalf of the user-terminal device according to rules.

Still further according to another aspect of the present invention there is provided a network device additionally operative to receive updates of the rules.

Even further according to another aspect of the present invention there is provided a network device additionally operative to selectively accumulate information on behalf of the user-terminal device.

Even further according to yet another aspect of the present invention there is provided a network device additionally operative to selectively accumulate information on behalf of the user-terminal device according to rules.

Even further according to still another aspect of the present invention there is provided a network device additionally operative to selectively forward the accumulated information to the user-terminal device.

Additionally according to yet another aspect of the present invention there is provided a network device additionally operative to selectively forward the accumulated information to the user-terminal device according to rules.

Additionally according to still another aspect of the present invention there is provided a network device additionally operative to receive updates for the rules.

Also according to another aspect of the present invention there is provided a network device additionally operative to perform peer operations on behalf of the user-terminal device when the user-terminal device is offline.

Also according to still another aspect of the present invention there is provided a network device additionally operative to perform peer operations on behalf of the user-terminal device when the user-terminal device is in stand-by mode.

Also according to yet another aspect of the present invention there is provided a network device wherein the network is an IP (Internet Protocol) network.

According to still another aspect of the present invention there is provided a network device wherein the network is the Internet.

According to yet another aspect of the present invention there is provided a network device additionally operative to perform the peer-to-peer operations on behalf of a plurality of user-terminal devices, wherein the peer-to-peer operations are performed independently of each of the user-terminal devices.

Further according to another aspect of the present invention there is provided a network device containing a peer communication module operative to communicate as a peer in a plurality of peer-to-peer networks, a terminal communication module operative to communicate with a user-terminal device, and at least one proxy module to perform peer operations in the plurality of peer-to-peer networks on behalf of the user-terminal device, wherein the peer operations enable the user-terminal device to access the plurality of peer-to-peer networks as a unified network.

Still further according to another aspect of the present invention there is provided a network device additionally operative to perform the peer-to-peer operations on behalf of a plurality of user-terminal devices, wherein the peer-to-peer operations are performed independently of each of the user-terminal devices.

Even further according to another aspect of the present invention there is provided a network device containing a peer-server communication module operative to communicate with a peer server, and a peer-to-peer communication module operative to perform peer-to-peer communication in a peer-to-peer network, wherein the peer-to-peer communication contains peer operations, and wherein the network device is operative to delegate at least some of the peer operations to the peer server.

Yet according to another aspect of the present invention there is provided a network device wherein the peer-server is operative to communicate as a peer in the peer-to-peer network and to perform peer operations in the peer-to-peer network on behalf of the network device.

Also according to another aspect of the present invention there is provided a network device wherein the peer operations delegated to the peer server contain registration as a peer in the peer-to-peer network.

Additionally according to another aspect of the present invention there is provided a network device additionally operative to selectively receive from the peer-server information received on behalf of the network device.

Additionally according to yet another aspect of the present invention there is provided a network device wherein the peer-to-peer network contains an IP (Internet Protocol) network.

Additionally according to further another aspect of the present invention there is provided a network device wherein the IP network is the Internet.

Further according to yet another aspect of the present invention there is provided a network device additionally being at least one of a portable network device, a mobile network device and a battery operated network device.

Further according to still another aspect of the present invention there is provided a network device additionally operative to communicate with the peer server device via a wireless network.

Still further according to another aspect of the present invention there is provided a network device wherein the wireless network contains at least one of a cellular network a wireless local area network, a wireless metropolitan area network, a personal area network, a WiFi network, a WiMAX network, a Bluetooth network, a Zigbee network and a UWB network.

Even further according to another aspect of the present invention there is provided a method for connecting a user terminal to a peer-to-peer network via a network device, wherein the network device performs peer operations in the peer-to-peer network on behalf of the user terminal.

Also according to another aspect of the present invention there is provided a method for connecting a user terminal to a peer-to-peer network containing the steps of, providing a network device operative to communicate with the user terminal and to communicate as a peer device in the peer-to-peer network, providing the network device with identification parameters of the user terminal as a peer in the peer-to-peer network, and performing peer operations in the peer-to-peer network, by the network device, on behalf of the user terminal, using the identification parameters.

Also according to yet another aspect of the present invention there is provided a method wherein the user terminal is at least one of a portable device, a mobile device and a battery operated device.

Also according to still another aspect of the present invention there is provided a method wherein the peer operations comprise registration as a peer in the peer-to-peer network on behalf of the user terminal.

Additionally according to another aspect of the present invention there is provided a method wherein the peer operations comprise providing call progress functionality on behalf of the user terminal.

Additionally according to still another aspect of the present invention there is provided a method wherein the call progress functionality affects at least one of incoming calls and outgoing calls.

Additionally according to further another aspect of the present invention there is provided a method wherein the call progress functionality contains providing ring-back signal to a calling party calling the user terminal on behalf of the user terminal.

Further according to another aspect of the present invention there is provided a method additionally containing selectively forwarding information received by the network device on behalf of the user terminal to the user terminal.

Further according to yet another aspect of the present invention there is provided a method additionally performing the selective forwarding according to predefined rules.

Further according to still another aspect of the present invention there is provided a method additionally providing updates for the rules.

Even further according to another aspect of the present invention there is provided a method additionally performing selective accumulation of information at the network device on behalf of the user terminal.

Still further according to another aspect of the present invention there is provided a method additionally performing the selective accumulation according to rules.

Still further according to yet another aspect of the present invention there is provided a method additionally performing selective forwarding of the accumulated information to the user-terminal device.

Also according to another aspect of the present invention there is provided a method additionally performing the forwarding of the accumulated information according to rules.

Also according to yet another aspect of the present invention there is provided a method additionally providing updates for the rules.

Also according to still another aspect of the present invention there is provided a method additionally performing the peer operations by the network device when the user-terminal is offline.

Additionally according to another aspect of the present invention there is provided a method additionally performing the peer operations by the network device when the user-terminal device is in stand-by mode.

Additionally according to yet another aspect of the present invention there is provided a method for connecting a user terminal to a plurality of peer-to-peer networks, the method containing the steps of: providing a network device operative to communicate with the user terminal and to communicate as a peer device in the plurality of peer-to-peer networks; providing the network device with identification parameters of the user-terminal as a peer in each of the peer-to-peer networks; and performing peer operations, in each of the peer-to-peer networks, by the network device, on behalf of the user terminal, using the identification parameters, wherein the peer operations enable the user-terminal device to access the plurality of peer-to-peer networks as a unified network.

Additionally, according to still another aspect of the present invention there is provided a method for connecting a plurality of user terminals to a peer-to-peer network, the method containing: providing a network device operative to communicate with the user terminals and to communicate as a peer device in at least one peer-to-peer network, providing the network device with identification parameters of each of the user terminals as a peer in the peer-to-peer network, and performing peer operations, in the peer-to-peer network, by the network device, on behalf of each of the user terminals, using the identification parameters.

Further according to another aspect of the present invention there is provided a computer program product, stored on one or more computer-readable media, containing instructions operative to cause a programmable processor of a network device to communicate as a peer in a peer-to-peer network, to communicate with a user-terminal device, and to perform peer operations in the peer-to-peer network on behalf of the user-terminal device.

Still further according to another aspect of the present invention there is provided a computer program product additionally containing instructions operative to cause the programmable processor of the network device to register as a peer in the peer-to-peer network on behalf of the user-terminal device.

Even further according to another aspect of the present invention there is provided a computer program product additionally containing instructions operative to cause the programmable processor of the network device to provide call progress functionality on behalf of the user-terminal device.

Additionally further according to another aspect of the present invention there is provided a computer program product additionally containing instructions operative to cause the programmable processor of the network device to provide the call progress functionality for at least one of incoming calls and outgoing calls.

Also according to another aspect of the present invention there is provided a computer program product additionally containing instructions operative to cause the programmable processor of the network device to provide a ring-back signal to a calling party calling the user-terminal device on behalf of the user-terminal device.

Also according to yet another aspect of the present invention there is provided a computer program product additionally containing instructions operative to cause the programmable processor of the network device to selectively forward information received on behalf of the user-terminal device to the user-terminal device.

Also according to still another aspect of the present invention there is provided a computer program product additionally containing instructions operative to cause the programmable processor of the network device to selectively forward information on behalf of the user-terminal device according to rules.

Additionally according to another aspect of the present invention there is provided a computer program product additionally containing instructions operative to cause the programmable processor of the network device to receive updates of the rules.

Additionally according to yet another aspect of the present invention there is provided a computer program product additionally containing instructions operative to cause the programmable processor of the network device to selectively accumulate information on behalf of the user-terminal device.

Additionally according to still another aspect of the present invention there is provided a computer program product additionally containing instructions operative to cause the programmable processor of the network device to selectively accumulate information on behalf of the user-terminal device according to rules.

Further according to another aspect of the present invention there is provided a computer program product additionally containing instructions operative to cause the programmable processor of the network device to selectively forward the accumulated information to the user-terminal device.

Further according to yet another aspect of the present invention there is provided a computer program product additionally containing instructions operative to cause the programmable processor of the network device to selectively forward the accumulated information to the user-terminal device according to rules.

Further according to still another aspect of the present invention there is provided a computer program product additionally containing instructions operative to cause the programmable processor of the network device to receive updates of the rules.

Still further according to another aspect of the present invention there is provided a computer program product containing instructions operative to cause the programmable processor of the network device to perform the peer operations on behalf of the user-terminal device when the user-terminal device is offline.

Even further according to another aspect of the present invention there is provided a computer program product containing instructions operative to cause the programmable processor of the network device to perform the peer operations on behalf of the user-terminal device when the user-terminal device is in stand-by mode.

Additionally according to another aspect of the present invention there is provided a computer program product wherein the peer-to-peer network is available over an IP (Internet Protocol) network.

Also according to another aspect of the present invention there is provided a computer program product wherein the peer-to-peer network is available over the Internet.

Also according to yet another aspect of the present invention there is provided a computer program product wherein the network device is operative to communicate with the user-terminal device via a wireless network.

Also according to still another aspect of the present invention there is provided a computer program product wherein the wireless network is one of a cellular network, a wireless local area network, a wireless metropolitan area network, a personal area network, a WiFi network, a WiMAX network, a Bluetooth network, a Zigbee network and a UWB network.

Additionally according to yet another aspect of the present invention there is provided a computer program product, stored on a computer-readable medium, containing instructions operable to cause a programmable processor of a network device to communicate as a peer in a plurality of peer-to-peer networks, to communicate with a user-terminal device, and to perform peer operations in the peer-to-peer networks on behalf of the user-terminal device, wherein the peer operations enable the user-terminal device to access the plurality of peer-to-peer networks as a unified network.

Additionally according to still another aspect of the present invention there is provided a computer program product stored on a computer-readable medium, containing instructions operable to cause a programmable processor of a network device to perform peer-to-peer communication in a peer-to-peer network, and to communicate with a peer server; wherein the peer-to-peer communication contains peer operations, and wherein the computer program product enables the network device to delegate at least some of the peer operations to the peer server.

Further according to another aspect of the present invention there is provided a computer program product wherein the peer operations delegated to the peer server comprise registration as a peer in the peer-to-peer network.

Further according to yet another aspect of the present invention there is provided a computer program product additionally operative to selectively receive from the peer-server information received on behalf of the network device.

Further according to still another aspect of the present invention there is provided a computer program product wherein the network device is operative to communicate with the peer server device via a wireless network Still further according to another aspect of the present invention there is provided a computer program product wherein the wireless network is one of a cellular network, a wireless local area network, a wireless metropolitan area network, a personal area network, a WiFi network, a WiMAX network, a Bluetooth network, a Zigbee network and a UWB network.

Even further according to another aspect of the present invention there is provided a peer-to-peer communication network containing at least one peer-server and a plurality of peer-devices, wherein at least one of the plurality of peer-devices, being a first peer-device, communicates with at least another one of the plurality of peer-devices, being a second peer device, via at least one of the peer-servers, being a first peer-server, and wherein the first peer-server performs peer operations in the peer-to-peer network on behalf of the first peer-device.

Also according to another aspect of the present invention there is provided a service containing registering a plurality of peer devices at a registration server, and registering at least one peer server at the registration server, wherein at least one of the plurality of peer-devices, being a first peer-device, communicates with at least another one of the plurality of peer-devices, being a second peer device, via at least one of the peer-servers, and wherein the peer-server performs peer operations in the peer-to-peer network on behalf of the first peer-device.

Unless otherwise defined, all technical and scientific terms used herein have the same meaning as commonly understood by one of ordinary skill in the art to which this invention belongs. The materials, methods, and examples provided herein are illustrative only and are not intended to be limiting. Except to the extend necessary or inherent in the processes themselves, no particular order to steps or stages of methods and processes described in this disclosure, including the figures, is intended or implied. In many cases the order of process steps may vary without changing the purpose or effect of the methods described.

Implementation of the method and system of the present invention involves performing or completing certain selected tasks or steps manually, automatically, or any combination thereof. Moreover, according to actual instrumentation and equipment of preferred embodiments of the method and system of the present invention, several selected steps could be implemented by hardware or by software on any operating system of any firmware or any combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention; the description taken with the drawings making apparent to those skilled in the art how the several forms of the invention may be embodied in practice.

In the drawings.

DESCRIPTION OF THE PREFERRED EMBODIMENTS

Figure 1:
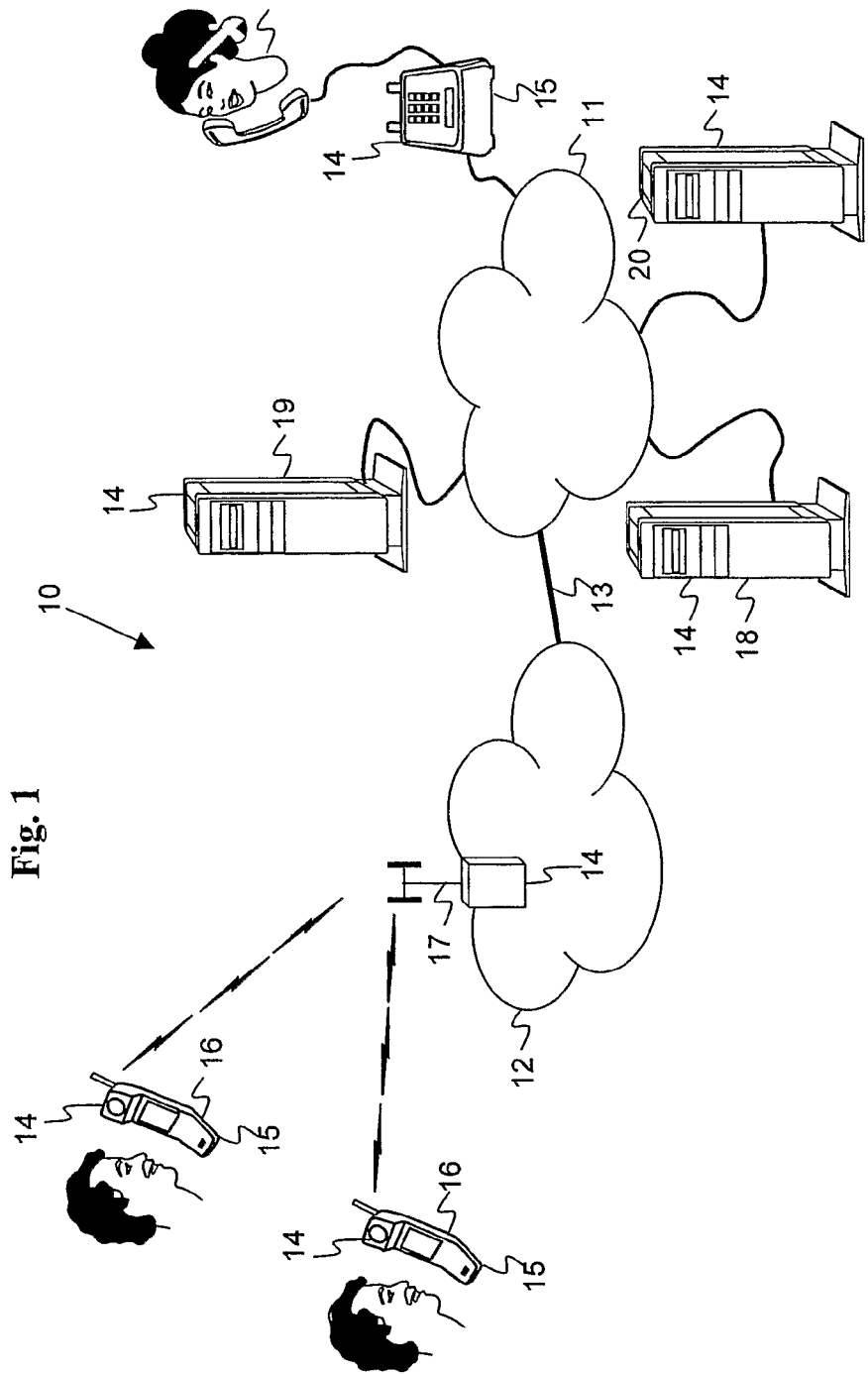
FIG. 1 is a simplified block diagram illustrating a peer-to-peer network according to a preferred embodiment of the present invention.

The principles and operation of a wireless peer-to-peer network according to the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

In this document, an element of a drawing that is not described within the scope of the drawing and is labeled with a numeral that has been described in a previous drawing has the same use and description as in the previous drawings.

Similarly, an element that is identified in the text by a numeral that does not appear in the drawing described by the text has the same use and description as in the previous drawings where it was described.

The invention integrates mobile wireless networks and wireline and/or fixed wireless networks. The systems and methods disclosed herein offer users the convenience and flexibility of location based routing over a preferred communication network such as wireline telephones, PSTN destinations and broadband communication networks. Such routing of calls and services is done automatically by a mobile handset (mobile terminal device) and its gateway (peer server). The mobile telephone handset may also communicate utilizing a wireless data network associated with the alternate telephone destination, such as communicating Voice-over-IP data and cellular GPRS and UMTS and other data networks.

The invention also provides methods of call management, which include detecting a mobile communication device, such as a mobile handset, via a wireless data network protocol, establishing a communication path with the mobile communication device using the wireless data network protocol, and sending a call-control message to a remote call management module associated with a mobile telecommunications network and associated with the mobile communication device. The mobile communication device is configured to communicate with the mobile telecommunications network and is configured to communicate with a wireless data network using a wireless data network protocol. The call control message can be sent via the PSTN or broadband communication network.

The invention is especially useful with peer-to-peer networks and applications.

A physical network is preferably a collection of physical network devices that are able to communicate between themselves via the physical network connections. Network devices are preferably nodes and terminal devices. A peer-to-peer network is typically a logical network of peers implemented over a physical network. A peer, or a peer device, or a peer terminal device, is typically a terminal device of the physical network, or a software program executed by the terminal device, which participates as a peer in the peer-to-peer network. The physical network can be a combination of networks of various communication standards as long as two peers can communicate directly through the combined network. A peer network is therefore a plurality of terminal devices that can communicate between themselves and that are associated with the peer-to-peer network. It is therefore possible to have several independent peer-to-peer networks implemented over the same physical network (or combination of physical networks). It is also possible for a terminal device to be a peer in several independent peer-to-peer networks.

A typical peer-to-peer network requires each peer device to continuously present itself to other peers, and to continuously interrogate the presence of other peers. Typically the peer-to-peer network has a registration server, also known as a broker, and each peer registers itself with the broker. Typically, each peer has at least one list of peers of interest with which it is willing to communicate. The peer can store this list in its local memory, or in the broker's storage, or both. Each time the peer accesses the network it informs the broker of its availability, current address, and other information that can be useful for the other peers. The peer also retrieves from the broker similar information regarding his peers of interest. The operations involving presenting the peer to the network and interrogating the presence of other peers, as well as other similar operations, are termed herein "peer operations".

Continuously performing peer operations would quickly drain the battery of a battery operated device, such as a mobile device, a portable cellular telephone, a cellular PDA, etc.

The present invention enables a converged communication services access gateway that provides the benefits of using a mobile device to access multiple communication networks and wireline services over any wireless interfaces. The present invention further provides real-time interaction for voice, data and video communications between one or more wireline and broadband communication service providers (CSP) and a single mobile telephony handset (MTH). On one hand, the present invention manages cascading of multiple communication services and multiple access control rights to gain services offered by the different CSP. On the other hand, the present invention controls a single appearance of MTH and provides gateway services between MTH and multiple CSP.

The present invention performs convergence services by conditionally processing, translating and rendering voice, data and video communications from multiple service providers, multiple communication standards, multiple compressing standards and multiple bearer formats. The present invention preferably includes:

1) a server side software application and middleware that runs on a Personal Computer (PC) or any other type of Access Point (AP);

2) a software application that is running on the mobile devices; and 3) any type of wireless communication interface over cellular channels and wireless channels.

The present invention relates to communication of content of all types including voice video and data between cellular network domains, PSTN networks and broadband networks for the provision of communication services and the management of such services. The communications services are delivered over any communication network including cellular networks, wireline networks, GPRS connections, Bluetooth connections, Wi-Fi connections and the like. The present disclosure relates generally to unified mobile telephone handsets for personal communications usage based on converged wireline and wireless networks.

In an increasingly mobile society, cellular handset and other mobile communication devices offer a user the ability to be in contact with others or reachable at all times. However, users of cellular phones typically have additional wireline phone numbers, PSTN telephony services, at home and at work, and broadband communications services at which they may be reached.

In a typical situation, a caller may attempt one of several numbers in an attempt to reach an individual. For example, a caller may first call a home number and then a cell number or office number. This added effort wastes time and communications resources.

To save time many callers will call a cellular number first. However, receiving a call on a cellular phone may be more expensive than receiving a phone call on the user's wireline phone. Furthermore, the cellular coverage, in general, may not be adequate within buildings for a quality voice session.

Other available communication options such as messaging services for PC-based devices can also cause problems. Such services provide other means for personal communication that is not tied to the PSTN and cellular network at all.

In addition, with the availability of the new telephony alternative, a user may choose to call over less expensive telephony networks using the same mobile handset in order to save money.

The present invention is preferably directed to the provision of an integrated wireless and wireline communications system and methods thereof. The system and methods disclosed herein offer users convenience and flexibility by providing location based routing over the best communication network selected from a group of alternative telephone destinations such as wireline telephones, PSTN destinations and broadband communication networks like Skype. Such routing of calls and services is done automatically by the mobile handset and the telephony gateway application. The mobile telephone handset may also communicate utilizing a wireless data network associated with the alternate telephone destination, such as communicating Voice-over-IP data and cellular GPRS and UMTS and other data networks.

In a further exemplary embodiment, the present invention involves a method of call management. The method includes detecting a mobile handset via a wireless data network protocol, establishing a communication path with the mobile communication device using the wireless data network protocol and sending a call control message to a remote call management module associated with the mobile telecommunications network and associated with the mobile communication device. The mobile communication device is preferably configured to communicate with a mobile telecommunications network and is additionally configured to communicate with a wireless data network using a wireless data network protocol. The call control message is sent via the PSTN or broadband communication network.

Reference is now made to FIG. 1, which is a simplified block diagram illustrating a peer-to-peer network 10 according to a preferred embodiment of the present invention.

The peer-to-peer network 10 of FIG. 1 is implemented over two physical networks of which at least one is a wireless network. The physical networks of FIG. 1 are a fixed network 11 and a wireless network 12 interconnected via a network interconnection 13. Network devices 14 are connected to the fixed network 11 and to the wireless network 12 and participate in the peer-to-peer network 10.

The fixed network 11 can use any communication standard such as Ethernet, IP (Internet Protocol), etc. The wireless network 12 can use any wireless standard such as GSM, CDMA, UMTS, GPRS, Wi-Fi, WiMax, Bluetooth, Zigbee, UWB, etc.

Peer devices 15 of the peer-to-peer network 10 are distributed over the two physical networks 11 and 12. Wireless peer devices 16 communicate via a wireless access provider 17, which typically includes a base station or an access point. In this respect wireless peer devices 16 also represent a battery operated device. The wireless peer device 16 is a network device of the type of a terminal device, also termed user-terminal device. The wireless peer device 16 is also named mobile terminal device or mobile peer device as may be relevant to the associated network being a mobile (or wireless) network or a peer-to-peer network.

A peer-to-peer network broker server 18 is typically connected to the fixed network 11. A peer server 19 is also typically and preferably connected to the fixed network 11. Application servers, such as server 20, can also be connected to the network, typically to the fixed network 11.

It is appreciated that peer devices 15 are terminal devices of either networks 11 and 12 and that other terminal devices, which are not peer devices in the peer-to-peer network 10, and are not shown in FIG. 1, may also be connected to the networks 11 and 12.

The terminal devices 15 of FIG. 1 are shown as telephones, however, it is appreciated that the terminal devices 15 can be any suitable terminal device, including, but not limited to, a PDA, a desktop computer, a laptop computer, a video player, a music player, an email communicator (such as a Blackberry, available from Research In Motion of Waterloo, Ontario, Canada N2L 3W8), an instant messaging communicator, etc.

Figure 2:
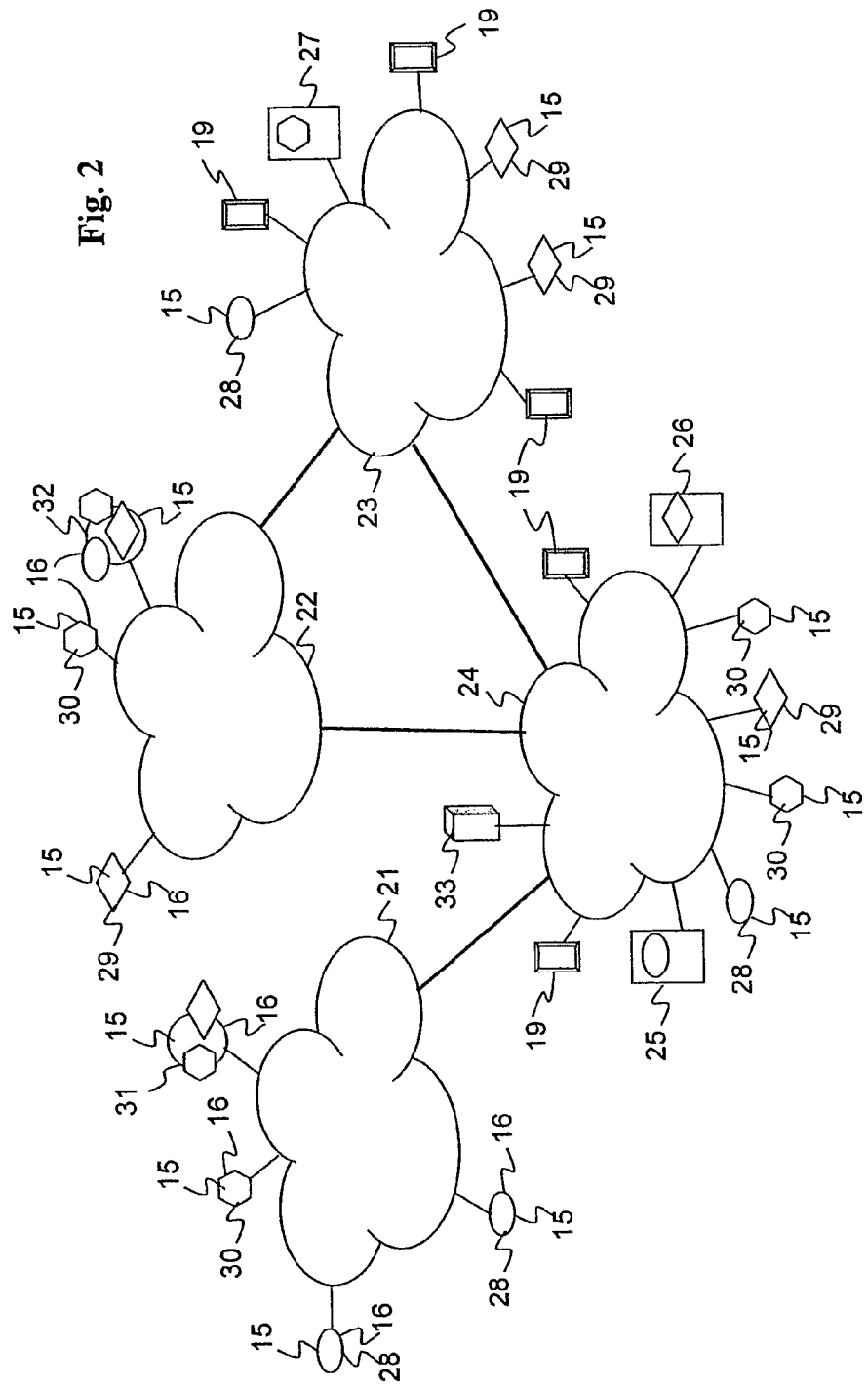
FIG. 2 is a simplified illustration of a plurality of peer-to-peer networks according to a preferred embodiment of the present invention.

Reference is now made to FIG. 2, which is a simplified illustration of a plurality of peer-to-peer networks 10 according to a preferred embodiment of the present invention.

As shown in FIG. 2, the peer-to-peer networks are implemented over a plurality of networks 21, 22, 23 and 24. In the example of FIG. 2, networks 21 and 22 are mobile wireless networks and networks 23 and 24 are wireline networks, or fixed wireless networks. In the example of FIG. 2, there are three peer-to-peer networks represented by application servers 25 (identified with an oval), 26 (identified with a rhombus) and 27 (identified with a hexagon). FIG. 2 also shows a plurality of terminal devices that function as peer devices 15 in the peer-to-peer networks. Terminal devices 15 drawn as ovals, such as terminal devices 28, participate in the peer-to-peer network served by server 25. Terminal devices 15 drawn as rhombuses, such as terminal devices 29, participate in the peer-to-peer network served by server 26. Terminal devices 15 drawn as hexagons, such as terminal devices 30, participate in the peer-to-peer network served by server 27. A terminal device 15 can function as a peer in several peer-to-peer networks, such as terminal devices 31 and 32. Peer servers 19 are connected to the networks 23 and 24 to serve the wireless peer devices 16 connected to the mobile wireless networks 21 and 22. Each wireless peer device 16 connected to a mobile wireless network is served by a peer server 19. Each peer server 19 can serve a single wireless peer device 16 or a plurality of wireless peer devices 16. Additionally, a coordination server 33 connects to network 24. The coordination server 33 serves all the peer servers 19 and all the peer devices 16 that use the peer servers 19. The coordination server 33 preferably enables mobile peer devices 16 to register themselves and store their profiles and related information in the coordination server 33. The coordination server 33 also enables these mobile peer devices 16 and their respective peer servers 19 to retrieve the respective registration, profile and related information from the coordination server's storage. The coordination server 33 serves the peer servers 19 and their respective mobile terminal devices 16 irrespective of the wireless network they subscribe to and the peer-to-peer network service they subscribe to.

It is appreciated that the coordination server 33 can connect to any network and that the connection to network 24 is just an example. Preferably, the coordination server 33 connects to a non-mobile network such as networks 23 and 24.

It is also appreciated that the coordination server 33 can be redundant, mirrored and distributed for enhanced resilience.

It is further appreciated that there can be several coordination servers 33, each serving its group of peer servers 19 and their mobile terminal devices 16.

Figure 3:
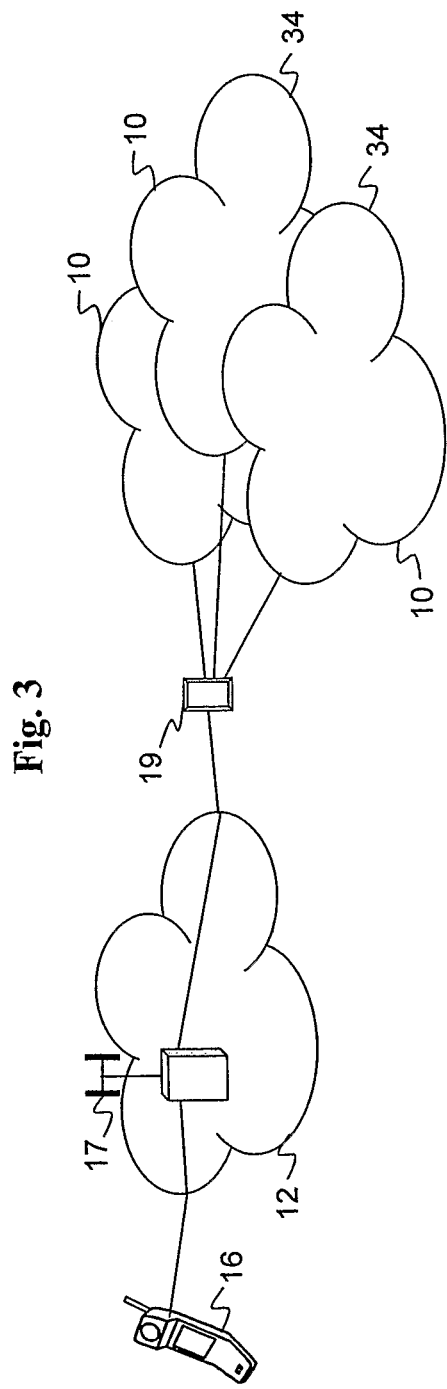
FIG. 3 is a simplified illustration of logical connectivity between a mobile terminal device and a plurality of peer-to-peer networks according to a preferred embodiment of the present invention.

Reference is now made to FIG. 3, which is a simplified illustration of logical connectivity between a mobile terminal device 16 and a plurality of peer-to-peer networks 10 according to a preferred embodiment of the present invention.

As shown in FIG. 3, the mobile wireless peer device 16 communicates via the wireless access provider 17 of the mobile wireless network 12, and via the peer server 19 with several peer-to-peer networks 10 and services 34. FIG. 3 thus illustrates an integration of wireless, wireline and broadband communication systems. The integrated communications system preferably includes one or more mobile peer devices 16, and one or more base stations, which are the wireless access provider(s) 17, within the wireless network 12. The system's coverage area is preferably provided by the network of wireless access providers 17. The wireless access providers 17 provide a wireless data network like Wi-Fi or Bluetooth to incorporate the peer device 16 with an authenticated two-way communication. The wireless network 12 may also be provided by a cellular provider like GPRS, UMTS or EDGE. The communication interface between the peer device 16 and the wireless access provider 17 may be over wireless data protocols, such as the IEEE 802.11x (Wi-Fi) or Bluetooth or cellular network standards, using the unlicensed frequency bands or licensed frequency bands. The peer device 16 communicates with a peer server application executed by the peer server 19. The peer server 19 is preferably a personal computer (PC). Alternatively, the peer server 19 is an Internet server available for public use on the Internet network. The peer server 19 provides universal access into different broadband, PSTN and cellular networks and convergence of several third-party communication applications available via these networks.

Figure 4:
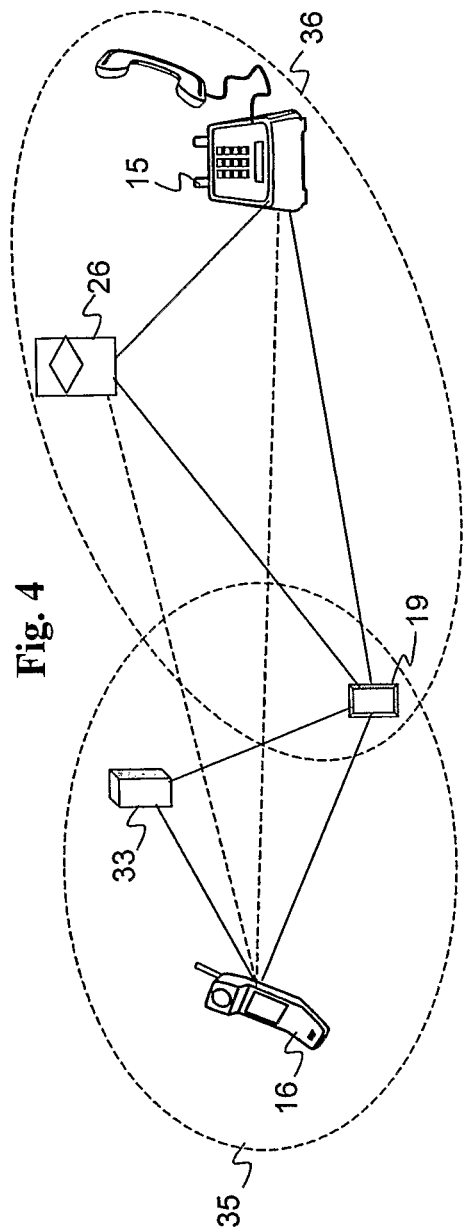
FIG. 4 is a simplified illustration of logical connectivity between a mobile peer terminal device and another peer device according to a preferred embodiment of the present invention.

Reference is now made to FIG. 4, which is a simplified illustration of a logical connectivity between mobile peer terminal device 16 and another peer device 15 according to a preferred embodiment of the present invention.

As shown in FIG. 4, the mobile wireless peer device 16, the peer server 19 and the coordination server 33 form a first logical network 35 and the peer device 15, the application server 26 and the peer server 19 form a second logical network 36; the two networks are interconnected by the peer server 19.

It is appreciated that the peer device 15, as well as the peer server 19, the coordination server 33, and the application server 26, can be connected to any type of network such as a wireline network, a fixed wireless network or a mobile wireless network.

Preferably, the mobile wireless peer device 16 and the peer server 19 register at the coordination server 33. Preferably the mobile wireless peer device 16 and the peer device 15 register at the application server 26 to form a peer-to-peer network.

Preferably, the mobile wireless peer device 16 communicates with the coordination server 33 to locate its peer server 19. Preferably, the peer server 19 communicates with the application server 26 and the peer device 15 on behalf of the mobile wireless peer device 16 within the logical network 36. By performing peer operations on behalf of the mobile wireless peer device 16, the peer server 19 appears to the peer device 15 as the mobile wireless peer device 16.

It is appreciated that, preferably, when a mobile terminal device 16 connects to the peer-to-peer network 10 it communicates and informs the peer server 19 of its availability and thereafter the peer server 19 functions on the network as a proxy for the mobile device 16.

It is also appreciated that, preferably, when the mobile terminal device 16 intends to communicates with another peer device, such as peer device 15, it communicates with the peer server 19 and receives all the required information regarding the target peer device 15 and then communicates directly with the target peer device 15.

It is further appreciated that, preferably, when a protocol conversion service, a store and forward service, or another type of mediating service is required, the mobile terminal device 16 communicates with the target peer device 15 via the peer server 19 and the peer server 19 provides the required protocol conversion and mediation service.

Figure 5:
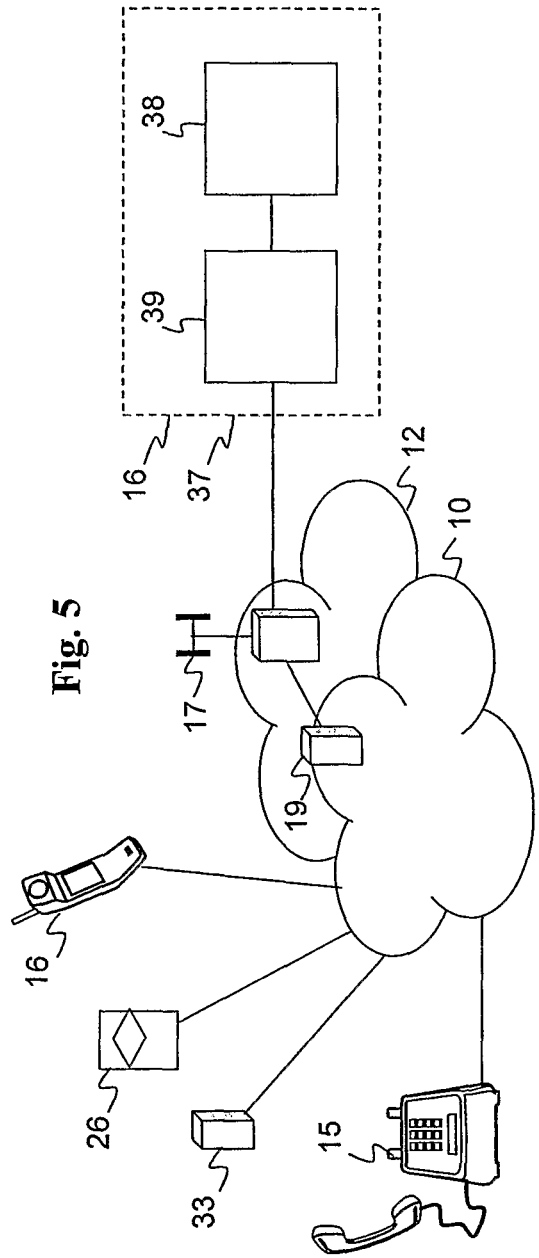
FIG. 5 is a simplified block diagram of a mobile peer device according to a preferred embodiment of the present invention.

Reference is now made to FIG. 5, which is a simplified block diagram of a mobile peer device 16 according to a preferred embodiment of the present invention.

The mobile peer device 16 (identified by numeral 37) preferably contains a peer communication module 38 and a terminal communication module 39. The terminal communication module preferably connects to a physical network, which in this case is the wireless network 12. Via the wireless network 12 the terminal communication module 39 is operative to communicate with other network devices and user-terminal devices, including wireless access provider 17 and peer server 19. The peer communication module 38 connects to the terminal communication module 39 and is operative to communicate as a peer in a plurality of peer-to-peer networks such as peer-to-peer network 10. Typically and preferably, the peer communication module 38 communicates with other peer devices, such as peer devices 15 and 16.

The peer communication module 38 is operative to delegate at least some of its peer operations to the peer server 19, and thereafter to use the peer operations performed by peer server 19 on behalf of the peer communication module 38, thus enabling the mobile peer device 16, 37 (being a user-terminal device) to communicate with other peer devices, such as peer devices 15 and 16, and with servers such as coordination server 33 and application server 26.

Figure 6:
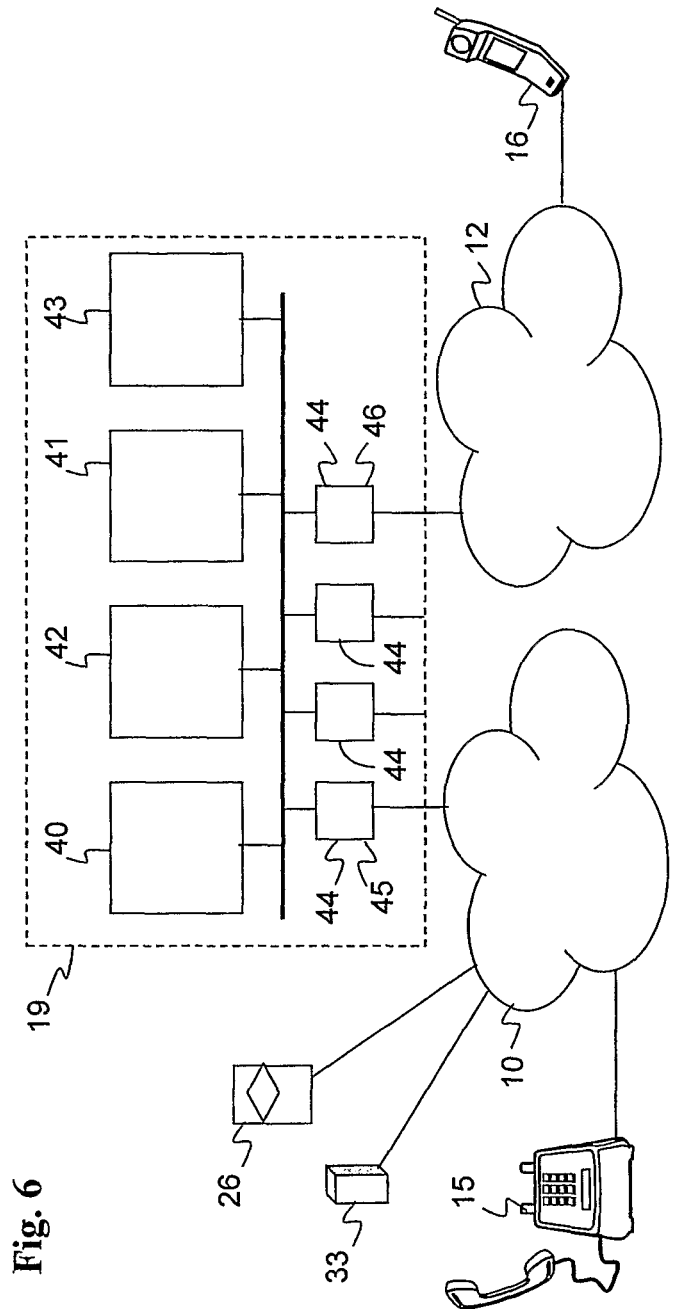
FIG. 6 is a simplified block diagram of a peer server according to a preferred embodiment of the present invention.

Reference is now made to FIG. 6, which is a simplified block diagram of a peer server 19 according to a preferred embodiment of the present invention.

As shown in FIG. 6, the peer server 19 preferably contains a peer-communication module 40, a terminal-communication module 41, a proxy module 42, a session manager service module 43, and one or more network interfacing modules 44. An appropriate network interfacing module 44, identified by numeral 45, preferably connects to the physical network bearing the peer-to-peer network 10 and preferably another interfacing module 44, identified by numeral 46, preferably connects to the physical network bearing the wireless network 12. The peer-to-peer network 10 can be implemented over an IP network, preferably the Internet. The wireless network 12 is typically a cellular network.

The peer-communication module 40 preferably communicates over the peer-to-peer network 10 with peer device 15, with the peer-to-peer network coordination server 33 and preferably also with application servers, such as application server 26. It is appreciated that there can be several peer-communication modules 40, each communicating over a different peer-to-peer network 10. The terminal-communication module 41 preferably communicates over the wireless network 12 with the mobile terminal device 16. The proxy module 42 performs peer operations in the (one or more) peer-to-peer network(s) 10 on behalf of the mobile terminal device 16. The proxy module 42 performs the peer operations in each peer-to-peer network 10 via the appropriate peer-communication modules 40 and network interfacing module 44.

When the mobile terminal device 16 wishes to communicate with another peer device 15 or with an application server 26 it preferably communicates with the proxy 42 to receive the information required to access the destination device.

The proxy module 42 preferably operates the other modules of the peer server 19 and therefore functions performed by the proxy module 42 described herein are functions of the peer server 19.

The proxy module 42 is preferably operative to initiate the peer operations even before the mobile terminal device 16 is turned on and to maintain the peer operations even when the mobile terminal device 16 is in offline mode or disconnected from the wireless network 12.

As a part of the peer operations the proxy module 42 registers as a peer in the peer-to-peer network on behalf of the mobile terminal device 16, which is preferably a user-terminal device. Preferably the proxy module 42 registers the mobile terminal device 16 with an appropriate peer coordination server 33. The proxy module 42 preferably loads from the peer coordination server 33 information related to the mobile terminal device 16 and to other peer devices 15. The proxy module 42 collects from the peer-to-peer network 10 presence information provided by other peer devices 15. According to rules preferably loaded from the coordination server 33, the proxy module 42 selectively accumulates this information and selectively forwards the information to the mobile terminal device 16. The proxy module 42 preferably communicates with the peer coordination server 33 to receive updates for the accumulation selection rules and for the forwarding selection rules.

The session manager service module 43 preferably manages linkage between the peer server 19 and external communication systems and services such as Skype and Google-Talk, to provide services convergence on behalf of its wireless peer terminal device 16.

As a part of the peer operations the proxy module 42 preferably provides call progress functionality on behalf of the user-terminal device. For example, when a peer device 15 calls the mobile terminal device 16 the proxy module 42 answers the call, informs the mobile terminal device 16, and until the mobile terminal device 16 answers the call the proxy module 42 sends a ring-back signal to the peer device 15 on behalf of the mobile terminal device 16. The proxy module 42 provides call progress functionality for both incoming calls and outgoing calls.

It is appreciated that the proxy module 42 can serve several mobile terminal devices 16 concurrently and independently of each other.

Figure 7:
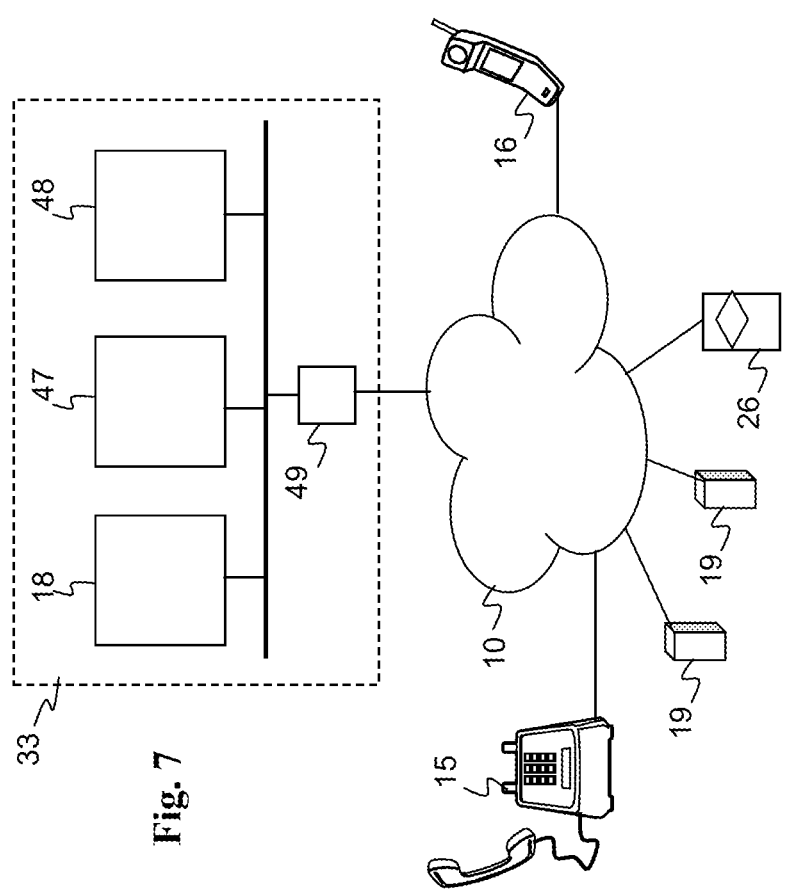
FIG. 7 is a simplified block diagram of a peer-to-peer coordination server according to a preferred embodiment of the present invention.

Reference is now made to FIG. 7, which is a simplified block diagram of a peer-to-peer coordination server 33 according to a preferred embodiment of the present invention.

As shown in FIG. 7, the coordination server 33 preferably contains a broker server 18, a database server 47, a messaging server 48 and a network interface 49. The broker server 18, the database server 47, and the messaging server 48 preferably communicate with the peer devices 15 and 16, with the peer servers 19, and with the application server 26 over the peer-to-peer network 10. The peer-to-peer network 10 preferably operates over at least one physical network and the broker server 18, the database server 47, and the messaging server 48 preferably connect to one of these physical networks via the network interface 49. It is appreciated that the messaging server 48 is optional. It is appreciated that the broker server 18, the database server 47, and the messaging server 48 can be preferably incorporated within a single physical server (e.g. computer) or alternatively, distributed within a plurality (two or three) physical servers (computers). It is appreciated that the broker server 18, the database server 47, and the messaging server 48 can communicate between themselves, preferably within the single physical server, or, alternatively over the peer-to-peer network 10.

The function of the broker server 18 includes enabling a peer server 19 to identify a firewall between the peer server 19 and the network, and to provide a proxy service to the peer server 19 to communicate through the firewall. Preferably the broker server 18 also provides relay services to other components of the coordination server 33.

The database server 47 provides services such as data storage and secured access to information such as user profiles, association of user IDs and peer servers, association of proxy services and peer servers, etc.

The messaging server 48 provides store-and-forward services for various types of contents and protocols.

Figure 8:
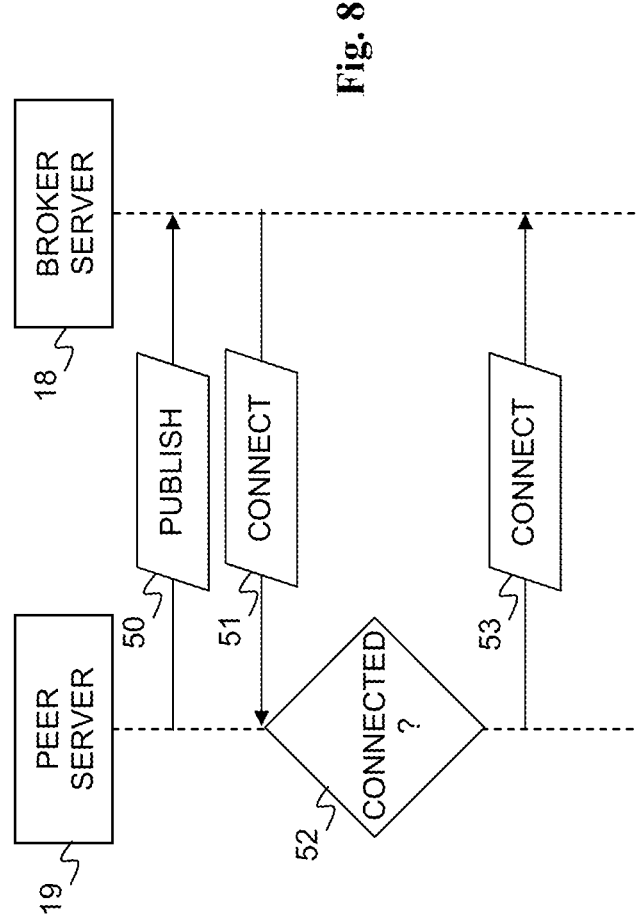
FIG. 8 is a simplified flow chart of a peer server start-up message sequence according to a preferred embodiment of the present invention.

Reference is now made to FIG. 8, which is a simplified flow chart of a peer server 19 start-up message sequence according to a preferred embodiment of the present invention.

The peer server start-up message sequence takes place between the peer server 19 and a broker server 18. The broker server 18 is preferably implemented within a coordination server 33 (FIG. 7). The start-up message sequence is initiated by the peer server 19 upon start-up, to publish itself as a peer in the peer-to-peer network 10 associated with the broker server 18, and to receive from the broker server 18 the details of the wireless peer terminal device 16, which the peer server 19 is assigned to serve (see FIG. 7).

The peer server 19 performs peer operations on behalf of the wireless peer terminal device 16. The peer operations includes, but are not limited to, initiating the registration of the wireless peer terminal device 16, which the peer server 19 is assigned to serve, as a peer in the peer-to-peer network 10. It is appreciated that the peer server 19 performs the registration and the following peer operations on behalf of the peer terminal device 16 even before the terminal device 16 has initiated communication with the peer server 19. It is appreciated that the peer server 19 performs the registration and the following peer operations on behalf of the associated wireless peer terminal device 16 even if the wireless peer terminal device 16 is turned off, is offline, is in stand-by mode, has lost communication due to any kind of communication problems, etc.

The message sequence preferably starts with the peer server 19 sending a publish message 50 to the broker server 18. The broker server 18 then sends to the peer server 19 a connect message 51 acknowledging the publish message. If the peer server 19 does not receive the connect message (element 52) within a predefined time frame the peer server 19 preferably concludes that there is a firewall between itself and the broker server 18. The peer server 19 then preferably reverts to a mode of communication enabling communication via a firewall and sends a connect message 53 to the broker server 18.

After receiving from the broker server 18 the identification and registration information regarding the wireless peer terminal device 16 associated with the peer server 19, the peer server 19 registers at the peer-to-peer networks 10 and the services to which the wireless peer terminal device 16 subscribes. For example, the terminal device is subscribed to Internet Telephony services such as Skype and GoogleTalk.

The peer server 19 then performs peer operations associated with these services, such as registration and presence operations, on behalf of the wireless peer terminal device 16. In order to perform these peer operations the peer server 19 uses access control authorization function for managing access rights and user service policies of these application provider servers. Preferably the broker server 18 provides the peer server 19 with identification parameters of the wireless terminal device 16 as a peer in the peer-to-peer networks 10 for which the wireless peer terminal device 16 subscribed. The peer server 19 then uses the identification parameters to perform peer operations in these peer-to-peer networks 10.

Figure 9:
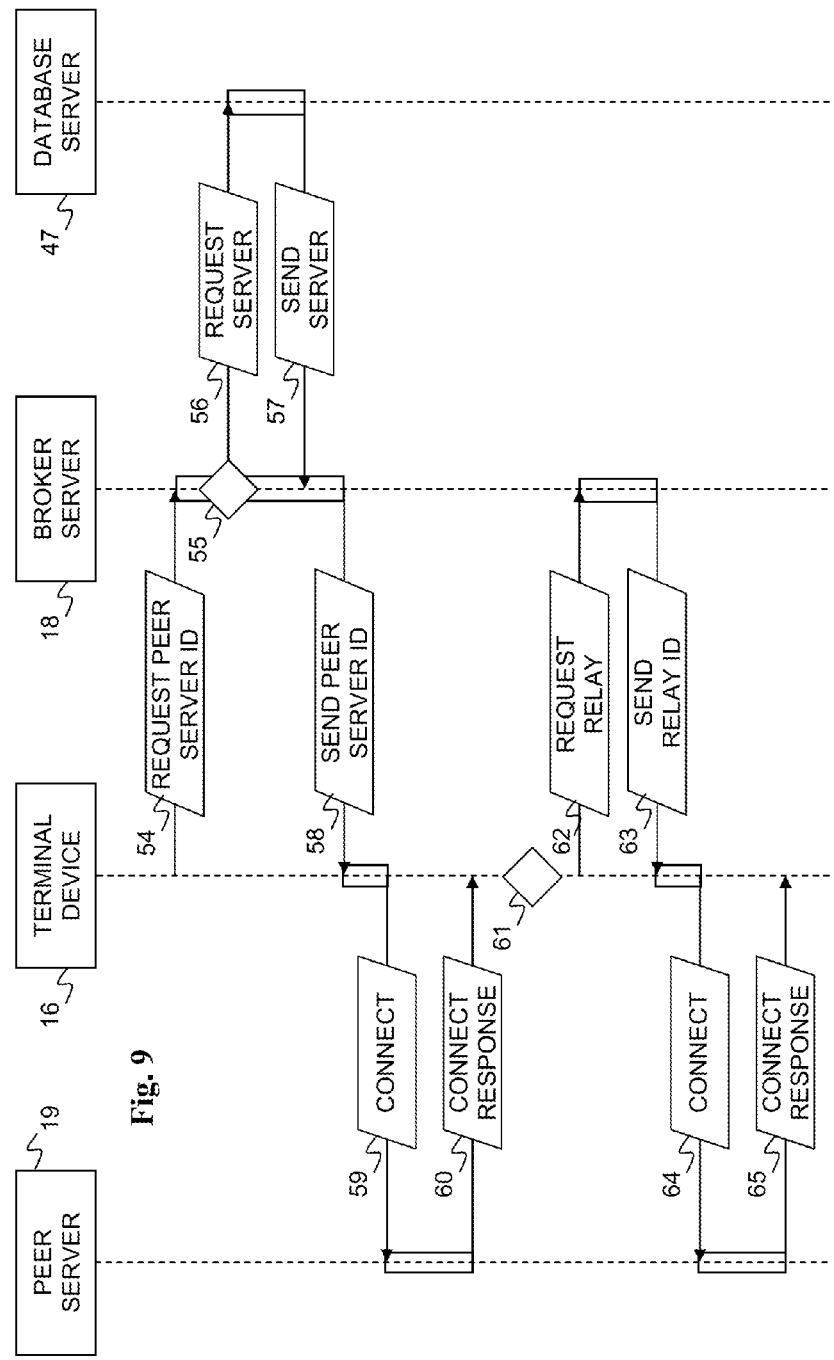
FIG. 9 is a simplified flow chart of a mobile peer terminal device start-up message sequence according to a preferred embodiment of the present invention.

Reference is now made to FIG. 9, which is a simplified flow chart of a mobile terminal device 16 start-up message sequence according to a preferred embodiment of the present invention.

The mobile terminal device start-up message sequence takes place between the mobile terminal device 16 and the peer server 19 with the support of the broker server 18 and a database server 47.

The start-up message sequence is initiated by the mobile terminal device 16 upon start-up. The mobile terminal device 16 preferably sends to the broker server 18 a message 54 requesting the details of the peer server 19 that provides peer services to the mobile terminal device 16. If the broker server 18 does not know the details of the requested peer server 19 (element 55) the broker server 18 sends a message 56 to the database server 47 requesting the information. The database server 47 then responds sending message 57 bearing the required information to the broker server 18. The broker server 18 then sends to the mobile terminal device 16 a message 58 bearing the information regarding the required peer server 19. The mobile terminal device 16 then sends a message 59 requesting connection to the peer server 19. The peer server 19 sends a connect response 60 to the mobile terminal device 16 preferably bearing an acknowledgement message.

If the acknowledgement message is not received at the mobile terminal device 16 within a predefined timeout (element 61), the mobile terminal device 16 concludes that there is a firewall between itself and its peer server 19. The mobile terminal device 16 then sends a message 62 to the broker server 18 requesting a relay server. The broker server 18 responds 63 with the information identifying the required relay server. The mobile terminal device 16 then re-sends (element 64) the connection request message to the peer server 19 via the relay server and receives (element 65) the connect response message from the peer server 19 via the relay server.

Figure 10:
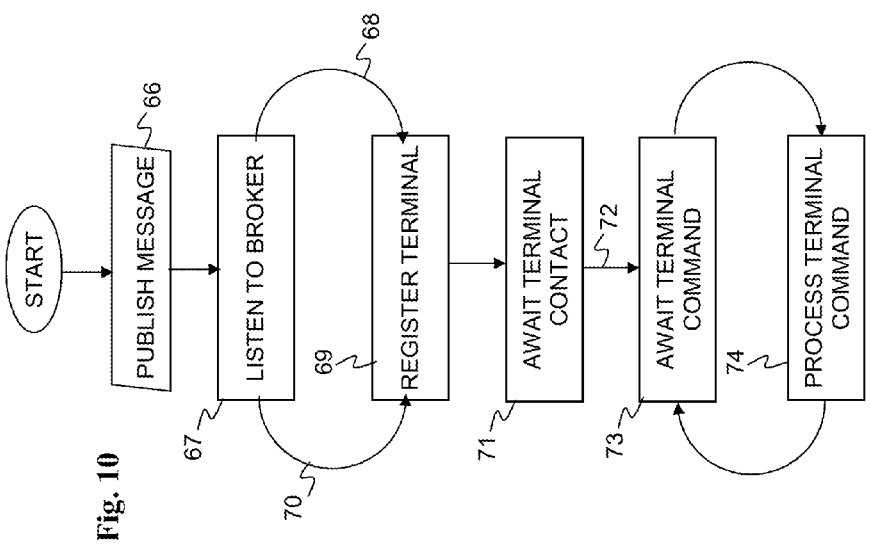
FIG. 10 is a simplified state diagram of a peer server according to a preferred embodiment of the present invention.

Reference is now made to FIG. 10, which is a simplified state diagram of a peer server 19 according to a preferred embodiment of the present invention.

The peer server 19 state-machine preferably starts by sending a publish message 66 to the broker server 18. The peer server 19 then listens (element 67) to the broker server 18. If a response message is received (element 68) the peer server 19 proceeds to element 69. If the response message from the broker server 18 is not received the peer server 19 connects to the broker server 18 via a relay server (element 70) and then proceeds to element 69.

In element 69, using information received from the broker server 18, the peer server 19 initiates peer operations on behalf of the wireless peer terminal devices 16 assigned to it. Typically and preferably the peer server 19 registers to the peer-to-peer networks 10 and the services with which the wireless peer terminal devices 16 are registered. As of registration, the peer server 19 performs peer operations, such as presence functions, on behalf of the wireless peer terminal devices 16, continuously.

At this time the terminal device may be switched off, or in stand-by mode, or disconnected due to poor communication conditions, or offline. The peer server 19 then awaits the terminal device 16 to assume communications (element 71).

When a first message is received from the wireless peer terminal device 16 (element 72) the peer server 19 processes the message (element 73) and then awaits (element 74) and processes further commands received from the wireless peer terminal device 16.

Figure 11:
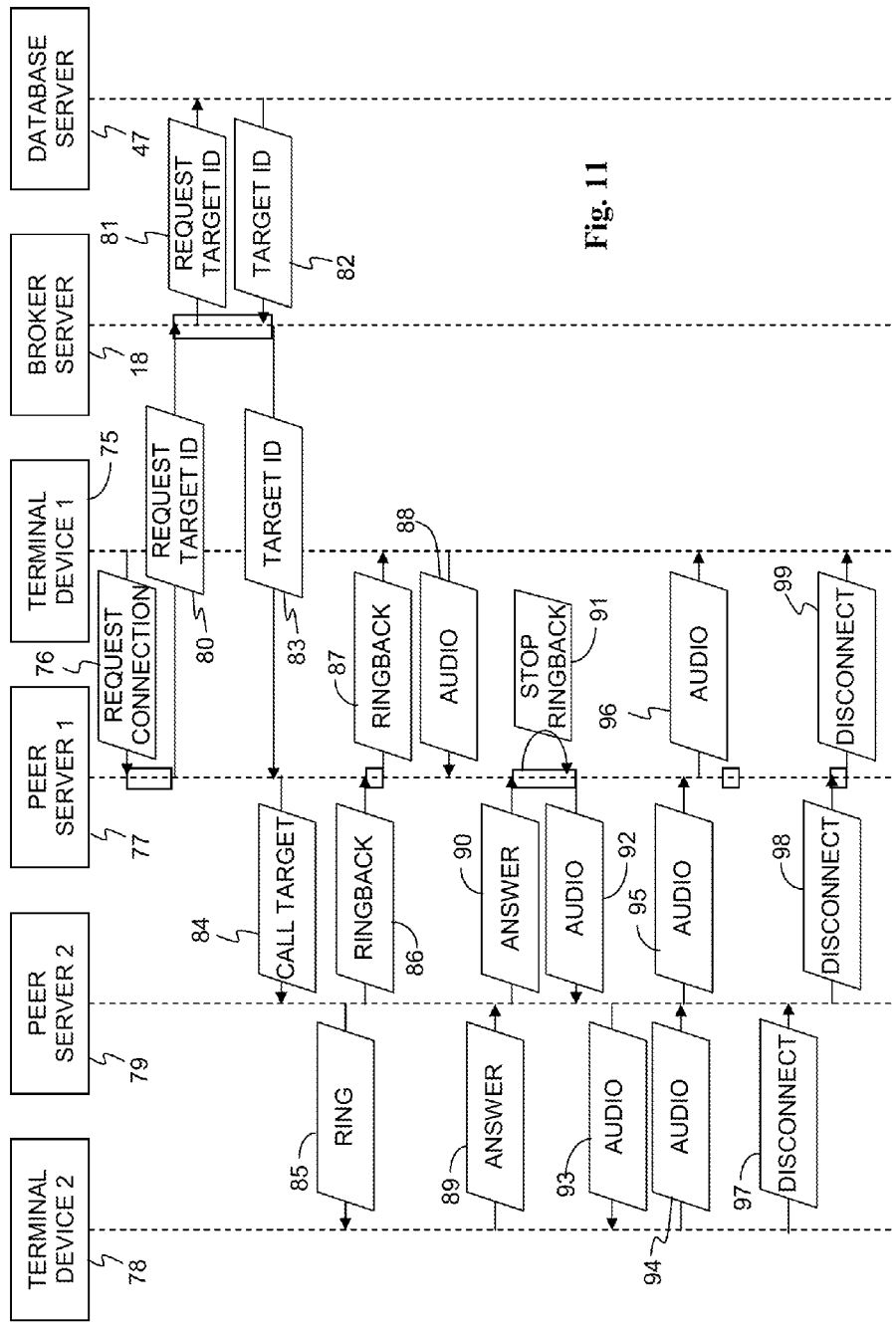
FIG. 11 is a simplified flow chart of a message sequence between two peer terminal devices according to a preferred embodiment of the present invention.

Reference is now made to FIG. 11, which is a simplified flow chart of a message sequence between two wireless peer terminal devices 16 according to a preferred embodiment of the present invention.

As shown in FIG. 11, a first terminal device 75, which is, for example, a mobile terminal device 16, starts the message sequence preferably by sending a message 76 to a first peer server 19, identified herein by numeral 77, that is assigned to perform peer operation on its behalf. In the message 76 the first terminal device 75 requests a connection with a second terminal device 78. In this example, the second terminal device is also a mobile terminal device 16, using a second peer server 19, identified herein by numeral 79, to perform peer operation on its behalf.

The process of FIG. 11 preferably takes place after peer servers 77 and 79 have initiated peer operations on behalf of their respective terminal devices 75 and 78. Both peer servers have registered on behalf of their wireless peer terminal devices 16 in their respective peer-to-peer networks 10. In these preliminary peer operations the peer servers 19 preferably received initial information pertinent to their respective wireless peer terminal devices 16. Such information contains identification and addressing information regarding other peer devices 15 or 16 in the relevant peer-to-peer networks 10.

Preferably the peer servers 19 also receive instructions and rules according to which the peer servers 19 accumulate information on behalf of their respective wireless peer terminal devices 16 and rules according to which the peer servers 19 forward information to their respective peers when such information is required by the wireless peer terminal devices 16.

A terminal device typically and preferably subscribes to several peer-to-peer networks and applications. Preferably, a peer server 19 converges the peer operations on behalf of the wireless peer terminal device 16 it serves. The converged peer operations enable the wireless peer terminal devices 16 to access the different peer-to-peer networks 10 and application servers in a unified manner, preferably so that the wireless peer terminal devices 16 access the different peer-to-peer networks 10 as a single unified network. Typically and preferably, when connecting to the second terminal device 78, the first terminal device 75 does not have to know the connection details such as the type of peer-to-peer network 10, the address of the second terminal device 78 in that network, etc.

Preferably the peer server 19 also performs conversion operations on behalf of its wireless peer terminal device 16. The peer server 19 preferably performs services convergence, for example, by conditionally processing or rendering content or messages from network bearers according to data received from other network systems, such as the broker server 18. Therefore, the wireless peer terminal device 16 does not have to know about the communication protocols and content formats. Preferably the peer server 19 performs protocol and format conversion, including compression transcoding, on behalf of the wireless peer terminal device 16 it serves. The peer server 19 preferably converts between an external content protocol operative between the peer server 19 and the destination device or service, and an internal content protocol operative between the peer server 19 and the wireless peer terminal device 16 it serves. Hence, each of the terminal devices 75 and 78 access their respective peer-to-peer networks 10 as a unified network.

Typically and preferably, when the first terminal device 75 requests connection, the first peer server 77 forwards to the first terminal device 75 information accumulated so far on behalf of the first terminal device 75. The information is preferably selectively forwarded to the first terminal device 75 according to rules preferably previously received from the broker server 18.

The first peer server 77 then sends a message 80 to the broker server 18 to receive information regarding the addressing of the targeted second terminal device 78. If the broker server 18 does not have the required information it sends a message 81 to the database server 47 requesting the information. The database server 47 responds (element 82) with the required information and the broker server 18 eventually sends (element 83) the information to the peer server 77. In this case, where the target second terminal device 78 is a mobile terminal device 16 using a peer server 19, the addressing information is the address of the second peer server 79.

Preferably the peer server 19 contains a workflow manager module for routing messages. The workflow manager now routes the message to the appropriate target terminal device by parsing the message to determine a routing list. In the example of FIG. 11, the target routing device, from the point of view of the first peer server 77 is the second peer server 79.

The first peer server 77 sends a call request 84 to the second peer server 79. The second peer server 79 receives the call request from the first peer server 77, sends a call request (ring) 85 to the second terminal device 78, and sends a ring-back signal 86 to the first terminal device 75. Elements 85 (ring), 86 and 87 are typical call-progress functions in a telephony system.

It is appreciated that in a similar manner the peer servers 77 and 79 process other call-progress functions, such as busy and call-not-answered signals, on behalf of their respective wireless peer terminal devices 16. In the example described in accordance with FIG. 11, the first peer server 77 processed outgoing-call call-progress signals on behalf of its wireless peer terminal device 75 and the second peer server 79 processed incoming-call call-progress signals on behalf of its wireless peer terminal device 78. It is appreciated that the peer server 19 can also provide routing functions, such as call-forwarding, follow-me, auto-attendant, message reception (voice-mail, email, SMS, etc.) as well as least-cost-routing, etc.

Since both wireless peer servers 19 (77 and 79), perform peer operations on behalf of their peer terminal devices 16 (75 and 78), both peer servers 77 and 79 assume that the other peer device is a terminal device.

The first peer server 77 forwards 87 the ring-back signal to the first terminal device 75 that starts sending audio signal 88.

As the second terminal device 78 sends a call answer signal 89 to the first terminal device 75, the second peer server 79 forwards 90 the call answer signal to the first peer server 77, which stops 91 the ring-back signal to the first terminal device 75 and starts forwarding 92 the audio signal 88 to the second peer server 79, which further forwards 93 the audio signal to the second terminal device 78.

Simultaneously, after sending the call answer signal 89, the second terminal device 78 starts sending audio signal 94 to the second peer server 79, which forwards 95 the audio signal to the first peer server 77, which forwards 96 the audio signal to the first terminal device 75.

At this stage, audio signals flow continuously between the two terminal devices, in both directions, via their respective peer devices.

Preferably, each of the peer servers performs service convergence on behalf of its terminal device 75 and 78. Such service convergence also includes converting one message, such as messages 92 and 94, into a plurality of messages 93 and 95, and vice versa. The plurality of messages 93 and 95 preferably bear different content formats to generate an output message with a different content format. Preferably, the peer servers perform service convergence by using a plurality of messages with differing underlying bearers, such as WiFi, WiMAX, Bluetooth, etc., to provide a single coherent message.

When one of the terminal devices 75 and 78 wishes to disconnect the call (the second terminal device 78 in the example of FIG. 11), it sends a disconnect message 97 to its peer server 79, which forwards 98 the disconnect signal to the other peer server 77, which forwards 99 the disconnect signal to the other terminal device 75.

It is appreciated that the process described herein in accordance with a typical telephone call can be performed with any other type of communication, such as video transmission, multimedia communication, conferencing, text messaging, voice messaging, video messaging, instant messaging etc.

In another embodiment of the present invention the peer server 19 additionally provides conversion services between the communication standard or protocol used in one network, such as network 34 of FIG. 3, and the network serving the terminal device, particularly a mobile wireless network, such as network 12 of FIG. 3. For example, the mobile wireless network 12 may impose communication constraints, such as bandwidth constraints, that require the peer server to provide compression conversion between network 34 and network 12 of FIG. 3.

Figure 12:
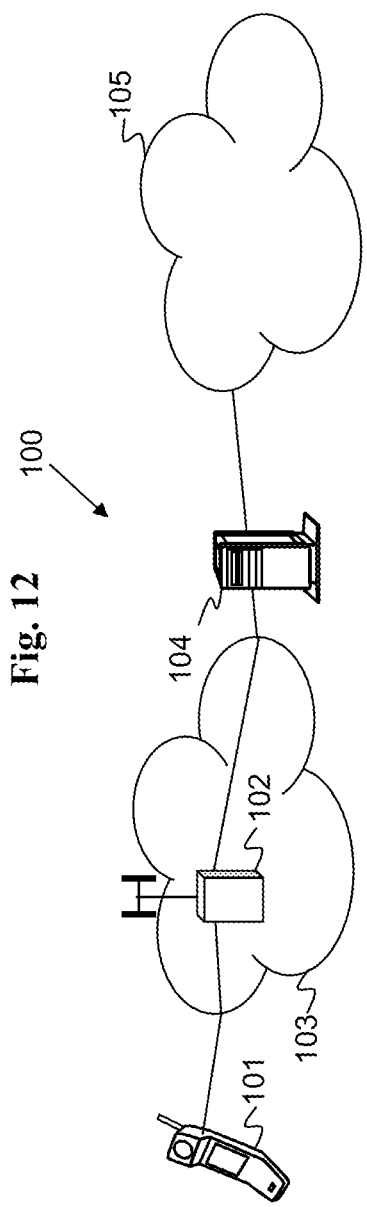
FIG. 12 is a simplified block diagram of an integrated communication system according to a preferred embodiment of the present invention.

Reference is now made to FIG. 12, which is a simplified block diagram of an integrated communication system 100 according to a preferred embodiment of the present invention.

FIG. 12 illustrates an integrated wireless and wireline or broadband communication system 100. The integrated communications system includes a mobile handset 101 and a personal base station 102 within a wireless detection area 103. The system coverage area 103 can be provided by an access point that provides a wireless data network like Wi-Fi or Bluetooth to incorporate the handset 101 with authenticated two-way communication. The system coverage area 103 may also be provided by a cellular provider like GPRS, UMTS or EDGE. The communication interface between the handset 101 and the personal base station 102 may be over wireless data protocols, such as the IEEE 802.11x (Wi-Fi) or Bluetooth or cellular network standards, using the unlicensed frequency bands or licensed frequency bands. The handset 101 communicates with a server application 104 running on a personal PC device or a global server available for public use somewhere on the Internet. The server application 104 is responsible for converging the many third-party communication applications and for providing universal access into different broadband, PSTN and cellular networks 105.

Figure 13:
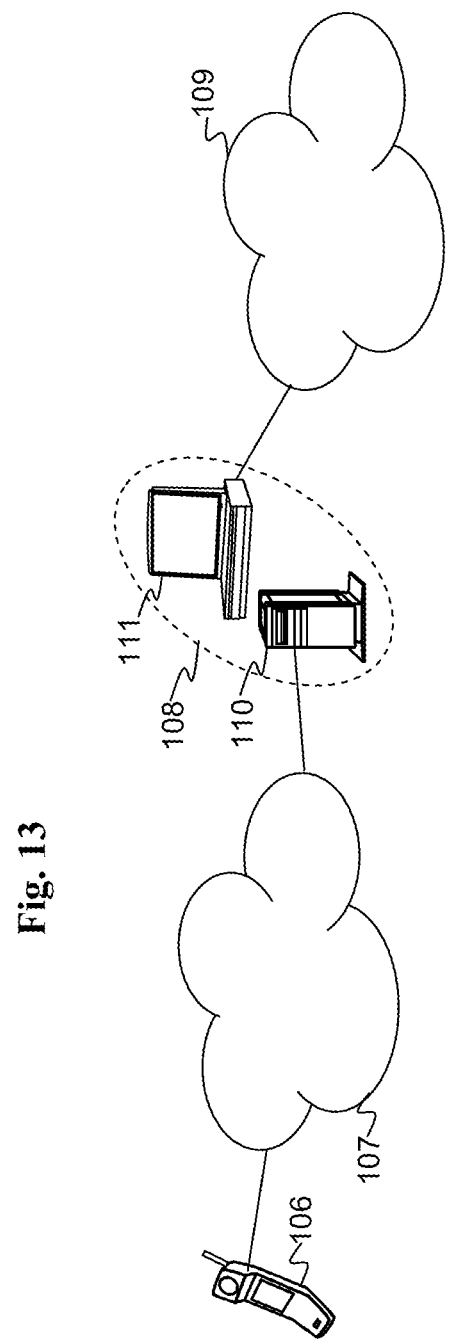
FIG. 13 is a simplified block diagram of a mobile handset communicating over a voice over Internet protocol (VoIP) broadband network according to a preferred embodiment of the present invention.

Reference is now made to FIG. 13, which is a simplified block diagram of a mobile handset 106 communicating over a voice over Internet protocol (VoIP) broadband network according to a preferred embodiment of the present invention.

In FIG. 13 the VoIP network, for exemplary purposes only, is provided using Skype software and serve, which is available at http://www.skype.com/. As shown in FIG. 13, a mobile handset 106, which is preferably a mobile terminal device 16, contains a client application software compatible with Skype. The mobile handset uses wireless or cellular RF channels 107 that may be Wi-Fi, Bluetooth, GPRS, UMTS, EDGE or the like to interface with a server application 108 and to communicate with other terminals over the Skype broadband network 109. The server application 108 preferably contains a proxy form Skype 110 and a Skype client 111.

Figure 14:
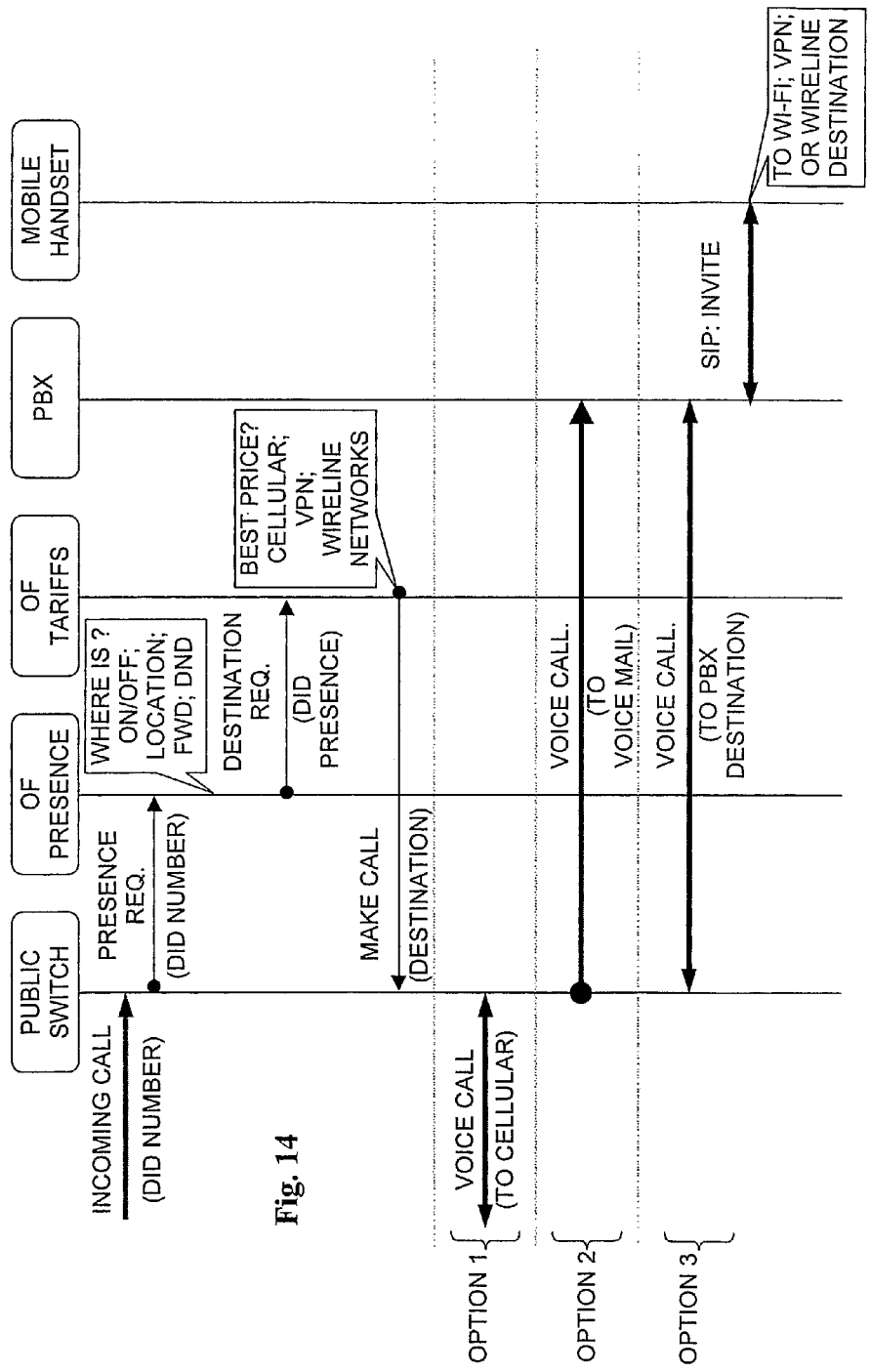
FIG. 14 is a simplified flow diagram illustrating an instance of an incoming call into a mobile handset from the public network according to a preferred embodiment of the present invention.

Reference is now made to FIG. 14, which is a simplified flow diagram illustrating an instance of an incoming call into a mobile handset 106 from the public network according to a preferred embodiment of the present invention.

The public network of FIG. 14 is preferably a PSTN or a cellular network where the server application (Presence and Tariff) is attached as an add-on to a PBX system.

In one embodiment of the present invention, each service preferably comprises routing information stored at creation of the service and the event dispatcher routes events according to said routing information.

In another embodiment of the present invention, the gateway further comprises a middleware internal communications mechanism and each service comprises a middleware handler for retrieving messages from a channel of the middleware communications mechanism and a handler for placing messages on a channel of the middleware communications mechanism.

In one embodiment of the present invention, at least one service preferably comprises a content protocol converter component.

In another embodiment of the present invention, said component preferably converts between an external content protocol and a content protocol, which is internal to the gateway and is used for processing of content by the gateway between the two interfaces.

In a further embodiment of the present invention, at least one service preferably comprises a logic rule component for processing message content.

In one embodiment of the present invention, the processor preferably comprises a workflow manager for routing messages within the gateway.

In another embodiment of the present invention, the workflow manager preferably routes a message by parsing a message to determine a routing list.

In a further embodiment of the present invention, the workflow manager preferably embeds a routing list within the message.

In a further embodiment of the present invention, the processor preferably performs convergence of services by using a plurality of messages with different content formats to generate an output message with a different content format.

In one embodiment of the present invention, the processor preferably performs convergence of services by using a plurality of messages with differing underlying bearers to provide a single coherent message.

In another embodiment of the present invention, the processor preferably performs convergence of services by conditionally processing and/or rendering the content or the messages from the network bearers according to data received from other network systems.

In a further embodiment of the present invention, a session manager service preferably manages linkages between the gateway and external systems for the convergence of services.

In a further embodiment of the present invention, the gateway preferably receives an input message bearing content of a first format. The gateway converts the content from the first format into an internal format, and then converts the internal format to a second format. The gateway then routes the message to an external system, receives a response from that external system bearing content in a third format. The gateway then converts the content from the third format to the internal format, and generates an output message with the content in a fourth format.

In one embodiment of the present invention, the processor preferably comprises an access control authorization function for managing access rights and user service policies of application provider servers.

In a further embodiment of the present invention, the access control authorization function automatically checks a fresh request for access rights and user service policy against a schema of an existing set of rights.

The present invention preferably provides a gateway having interfaces with application provider servers in the Internet domain and with enablers in the mobile network domain. The gateway, using its various interfaces, enables a wide variety of content download and user service provision to subscribers. Content or user services may be provided by a particular AP (access point) server operating independently or via a web of linked AP servers with very simple setup by virtue of the cascaded access control right mechanism. Another major advantage is the ability to efficiently perform services convergence of content formats to provide the desired content format or service type for the subscriber. This is achieved despite the fact that there are a wide variety of subscriber mobile device capabilities and AP content formats. The fact that the gateway interacts with mobile network enablers in two-way sessions before final delivery to the subscriber provides considerable versatility in service convergence.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A network device comprising:
a peer-communication module operative to communicate as a peer in a peer-to-peer network;
a terminal-communication module operative to communicate with a user-terminal device; and
a proxy module operative to perform peer operations in said peer-to-peer network on behalf of said user-terminal device,
wherein said peer operations comprise at least one of
selectively forwarding information on behalf of said user-terminal device according to rules, and
selectively accumulating information on behalf of said user-terminal device according to rules,
wherein said network device appears as a peer in said peer-to-peer network using said peer-communication module, wherein said peer operations are performed by said proxy module via said peer-communication module, and wherein said network device identifies itself to another peer device as said user-terminal device.

2. A network device according to claim 1 additionally operative to register as a peer in said peer-to-peer network on behalf of said user-terminal device.

3. A network device according to claim 1 additionally operative to provide call progress functionality on behalf of said user-terminal device.

4. A network device according to claim 3 additionally operative to provide said call progress functionality for at least one of incoming calls and outgoing calls.

5. A network device according to claim 3 additionally operative to provide ring-back signal to a calling party calling said user-terminal device on behalf of said user-terminal device.

6. A network device according to claim 1 additionally operative to receive updates of said rules.

7. A network device according to claim 1 additionally operative to selectively forward said accumulated information to said user-terminal device.

8. A network device according to claim 7 additionally operative to selectively forward said accumulated information to said user-terminal device according to rules.

9. A network device according to claim 8 additionally operative to receive updates for said rules.

10. A network device according to claim 1 additionally operative to perform peer operations on behalf of said user-terminal device when said user-terminal device is offline.

11. A network device according to claim 1 additionally operative to perform peer operations on behalf of said user-terminal device when said user-terminal device is in stand-by mode.

12. A network device according to claim 1 wherein said network is an IP (Internet Protocol) network.

13. A network device according to claim 1 wherein said network is the Internet.

14. A network device according to claim 1 additionally operative to perform said peer operations on behalf of a plurality of user-terminal devices, wherein said peer operations are performed independently of each of said user-terminal devices.

15. A network device according to claim 1 wherein said terminal-communication module is operative to communicate with a user-terminal device and wherein said user-terminal device is at least one of: a portable network device, a mobile network device and a battery operated network device and wherein said network device appears to another peer device in said peer-to-peer network as at least one of: a portable network device, a mobile network device and a battery operated network device.

16. A network device comprising:
a peer communication module operative to communicate as a peer in a plurality of peer-to-peer networks;
a terminal communication module operative to communicate with a user-terminal device; and
at least one proxy module operative to perform peer operations in said plurality of peer-to-peer networks on behalf of said user-terminal device,
wherein said network device identifies itself to other peer devices as said user-terminal device;
wherein said peer operations comprise at least one of protocol conversion and format conversion to enable said user-terminal device to access said plurality of peer-to-peer networks as a unified network.

17. A network device according to claim 16 additionally operative to perform said peer-to-peer operations on behalf of a plurality of user-terminal devices, wherein said peer-to-peer operations are performed independently of each of said user-terminal devices.

18. A method for connecting a user terminal to a peer-to-peer network via a network device, said method comprising the steps of:
providing said network device wherein said network device is operating as a proxy of said user terminal in said peer-to-peer network; and
performing peer operations by said network device in said peer-to-peer network on behalf of said user terminal, wherein said peer operations comprise at least one of selectively forwarding information on behalf of said user-terminal device according to rules, and selectively accumulating information on behalf of said user-terminal device, wherein said network device appears as a peer in said peer-to-peer network using said peer-communication module, wherein said peer operations are performed by said proxy module via said peer-communication module, and wherein said network device identifies itself to another peer device as said user-terminal device.

19. A method according to claim 18 wherein said user terminal is at least one of a portable device, a mobile device and a battery operated device.

20. A method according to claim 18 wherein said peer operations comprise registration as a peer in said peer-to-peer network on behalf of said user terminal.

21. A method according to claim 18 wherein said peer operations comprise providing call progress functionality on behalf of said user terminal.

22. A method according to claim 21 wherein said call progress functionality affects at least one of incoming calls and outgoing calls.

23. A method according to claim 21 wherein said call progress functionality comprises providing ring-back signal to a calling party calling said user terminal on behalf of said user terminal.

24. A method according to claim 18 additionally providing updates for said rules.

25. A method according to claim 18 additionally performing selective forwarding of said accumulated information to said user-terminal device.

26. A method according to claim 25 additionally performing said forwarding of said accumulated information according to rules.

27. A method according to claim 26 additionally providing updates for said rules.

28. A method according to claim 18 additionally performing said peer operations by said network device when said user-terminal is offline.

29. A method according to claim 18 additionally performing said peer operations by said network device when said user-terminal device is in stand-by mode.

30. A method for connecting a user terminal to a peer-to-peer network comprising the steps of:

providing a network device with at least one proxy module operative to perform the steps of:
communicating with said user terminal; and
communicating as a peer device in said peer-to-peer network;

providing said network device with identification parameters of said user terminal as peer in said peer-to-peer network; and performing peer operations in said peer-to-peer network, by said network device, on behalf of said user terminal, using said identification parameters, such that said network device identifies itself to another peer device as said user-terminal device.

31. A method for connecting a user terminal to a plurality of peer-to-peer networks, the method comprising:

providing a network device operative to communicate with said user terminal and to communicate as a peer device in said plurality of peer-to-peer networks;

providing said network device with identification parameters of said user-terminal as a peer in each of said peer-to-peer networks; and performing peer operations, in each of said peer-to-peer network, by said network device, wherein said peer operations are performed by a proxy module on behalf of said user terminal, using said identification parameters such that said network device identifies itself to another peer device as said user-terminal device, and wherein said peer operations comprise at least one of protocol conversion and format conversion to enable said user-terminal device to access said plurality of peer-to-peer networks as a unified network.

32. A method for connecting a plurality of user terminals to a peer-to-peer network, the method comprising:

providing a network device operative to communicate with said user terminals and to communicate as a peer device in at least one peer-to-peer network;

providing said network device with identification parameters of each of said user terminals as a peer in said peer-to-peer network; and performing peer operations, in said peer-to-peer network, by said network device, wherein said peer operations are performed by a proxy module on behalf of each of said user terminals, using said identification parameters, such that said network device identifies itself to another peer device as said user-terminal device.

33. A computer program product, stored on a non-transitory computer-readable medium, comprising instructions operative to cause a programmable processor of a network device to:

communicate as a peer in a peer-to-peer network;

communicate with a user-terminal device, and to perform peer operations in said peer-to-peer network, wherein said peer operations are performed by a proxy module on behalf of said user-terminal device, and wherein said peer operations comprise at least one of
selectively forwarding information on behalf of said user-terminal device according to rules, and
selectively accumulating information on behalf of said user-terminal device, wherein said network device appears as a peer in said peer-to-peer network using said peer-communication module, wherein said peer operations are performed by said proxy module via said peer-communication module, and wherein said network device identifies itself to another peer device as said user-terminal device.

34. A computer program product according to claim 33 additionally comprising instructions operative to cause said programmable processor of said network device to register as a peer in said peer-to-peer network on behalf of said user-terminal device.

35. A computer program product according to claim 33 additionally comprising instructions operative to cause said programmable processor of said network device to provide call progress functionality on behalf of said user-terminal device.

36. A computer program product according to claim 35 additionally comprising instructions operative to cause said programmable processor of said network device to provide said call progress functionality for at least one of incoming calls and outgoing calls.

37. A computer program product according to claim 35 additionally comprising instructions operative to cause said programmable processor of said network device to provide ring-back signal to a calling party calling said user-terminal device on behalf of said user-terminal device.

38. A computer program product according to claim 33 additionally comprising instructions operative to cause said programmable processor of said network device to receive updates of said rules.

39. A computer program product according to claim 33 additionally comprising instructions operative to cause said programmable processor of said network device to selectively forward said accumulated information to said user-terminal device.

40. A computer program product according to claim 39 additionally comprising instructions operative to cause said programmable processor of said network device to selectively forward said accumulated information to said user-terminal device according to rules.

41. A computer program product according to claim 40 additionally comprising instructions operative to cause said programmable processor of said network device to receive updates of said rules.

42. A computer program product according to claim 33 comprising instructions operative to cause said programmable processor of said network device to perform said peer operations on behalf of said user-terminal device when said user-terminal device is offline.

43. A computer program product according to claim 33 comprising instructions operative to cause said programmable processor of said network device to perform said peer operations on behalf of said user-terminal device when said user-terminal device is in stand-by mode.

44. A computer program product according to claim 33 wherein said peer-to-peer network is available over an IP (Internet Protocol) network.

45. A computer program product according to claim 33 wherein said peer-to-peer network is available over the Internet.

46. A computer program product according to claim 33 wherein said network device is operative to communicate with said user-terminal device via a wireless network.

47. A computer program product according to claim 46 wherein said wireless network is one of a cellular network a wireless local area network, a wireless metropolitan area network, a personal area network, a WiFi network, a WiMAX network, a Bluetooth network, a Zigbee network and a UWB network.

48. A computer program product, stored on a non-transitory computer-readable medium, comprising instructions operable to cause a programmable processor of a network device to:
 communicate as a peer in a plurality of peer-to-peer networks;
 communicate with a user-terminal device; and
 perform peer operations in said peer-to-peer network,
wherein said peer operations are performed by a proxy module on behalf of said user-terminal device such that said network device identifies itself to other peer devices as said user-terminal device; and
 wherein said peer operations comprise at least one of protocol conversion and format conversion to enable said user-terminal device to access said plurality of peer-to-peer networks as a unified network.

\* \* \* \* \*